United States Patent [19]

Ubhayakar

[11] Patent Number: 4,953,961
[45] Date of Patent: Sep. 4, 1990

[54] LIGHT BEAM POSITIONER

[75] Inventor: Shivadev K. Ubhayakar, Rancho Palos Verdes, Calif.

[73] Assignee: TRW Inc., Redondo Beach, Calif.

[21] Appl. No.: 304,148

[22] Filed: Jan. 31, 1989

[51] Int. Cl.$^5$ .............................................. G02B 26/08
[52] U.S. Cl. ....................... 350/486; 350/6.5
[58] Field of Search ............... 350/6.5, 485, 484, 486, 350/487, 623; 250/522.1, 491.1

[56] References Cited

U.S. PATENT DOCUMENTS

| | | | |
|---|---|---|---|
| 3,414,354 | 12/1968 | Siegler | 356/75 |
| 3,531,183 | 9/1970 | Aagard | 350/160 |
| 3,612,642 | 10/1971 | Nostal | 350/486 |
| 3,902,783 | 9/1975 | Bodlaj | 350/6 |
| 4,402,575 | 9/1983 | Jacobs | 27/17 |
| 4,691,999 | 9/1987 | Wheeler | 350/620 |
| 4,708,420 | 11/1987 | Liddiard | 350/6.6 |

FOREIGN PATENT DOCUMENTS 0134726 6/1986 Japan ...................................... 350/6.5
0285424 12/1986 Japan ...................................... 350/6.5

*Primary Examiner*—Bruce Y. Arnold
*Assistant Examiner*—Ronald M. Kachmarik
*Attorney, Agent, or Firm*—Ronald M. Goldman; Ronald L. Taylor

[57] ABSTRACT

A light deflection apparatus includes a pair of mirrors in confronting relationship, one of which is fixed in position and contains a central window, in which to input a laser light beam or in which to mount a suitable light beam generating source, such a diode laser. The other mirror is movably mounted so as to permit varying the degree of tilt between the mirrors and azimuthal location of the bisecting plane of symmetry and the spacing. The apparatus is adapted to permit targeting of light beams to different objects rapidly for use in communications systems and military systems. The apparatus also is adapted to function as the light positioning element of an optical spatial modulator.

36 Claims, 2 Drawing Sheets

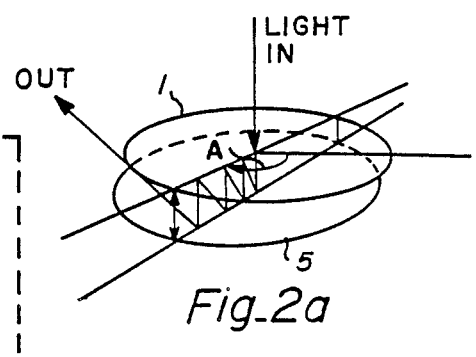
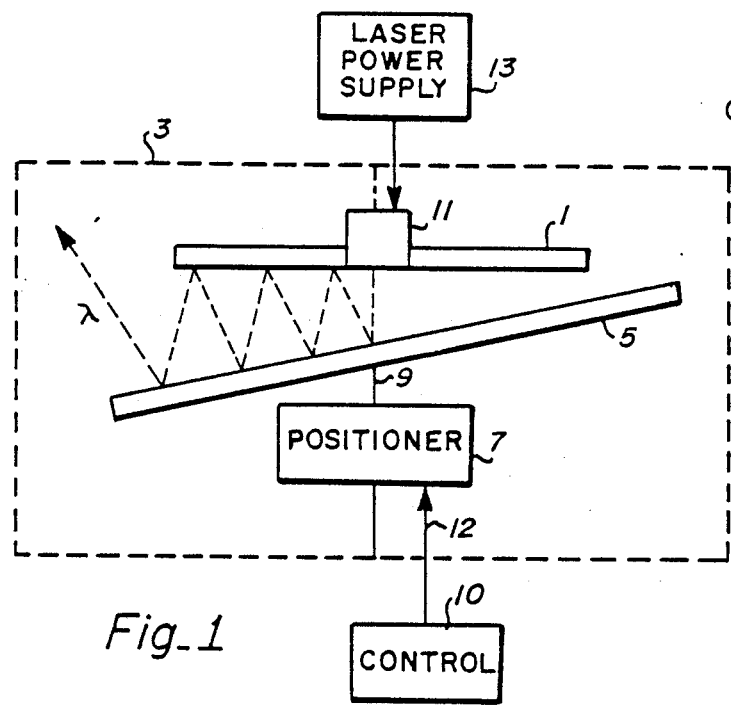
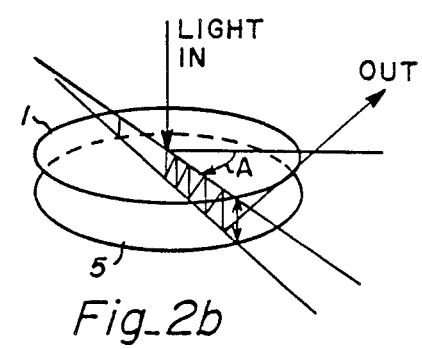
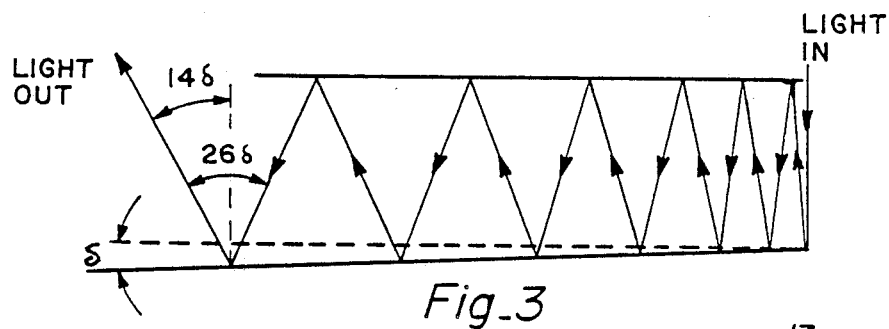
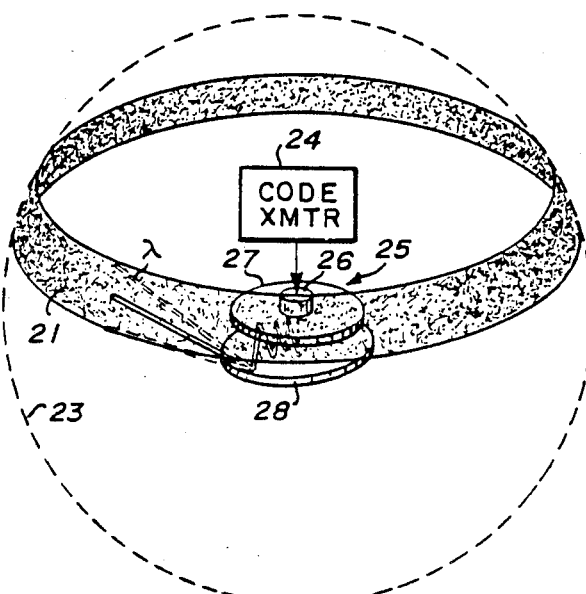
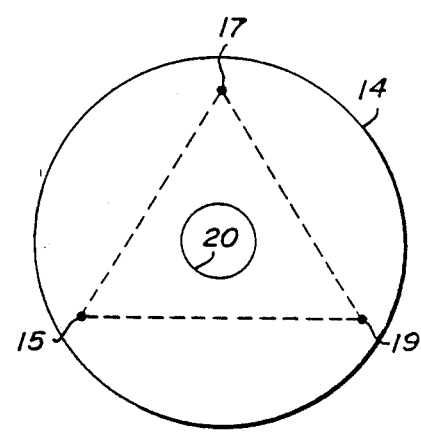
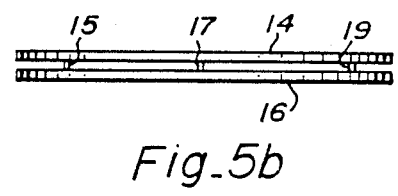

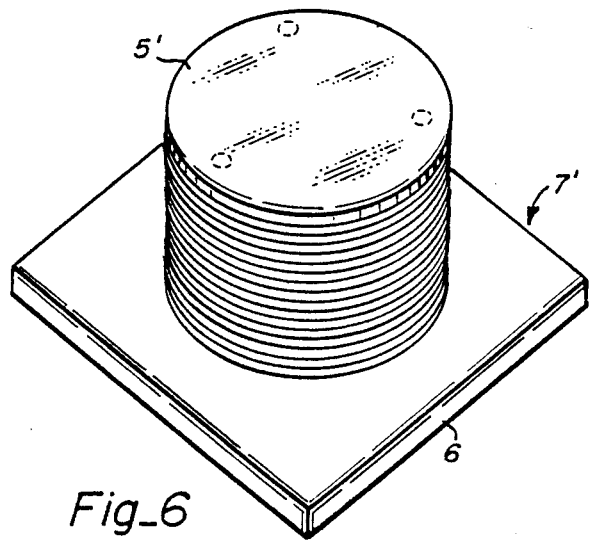
Fig_6
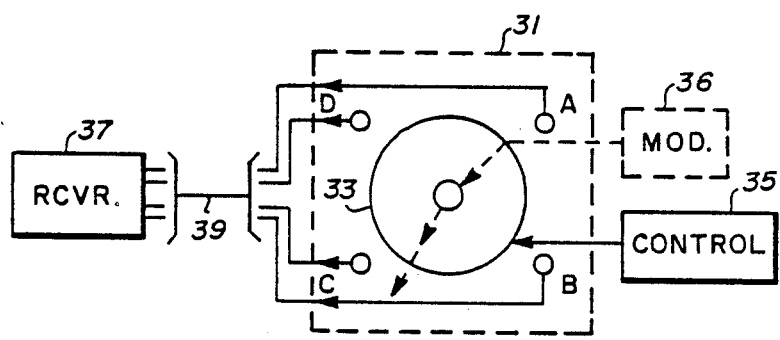
Fig_7
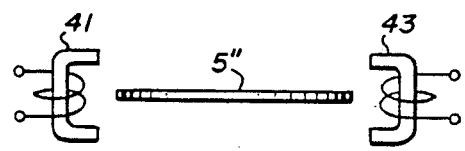
Fig_8

LIGHT BEAM POSITIONER

FIELD OF THE INVENTION

This invention relates to apparatus for directing a light beam and, more particularly, to a light beam positioning device for targeting a laser produced light beam over a wide range of positions at a rapid rate useful in optical targeting and spatial modulation applications.

1. Reference to Prior Applications

This application is related to an earlier filed application, entitled Flexidigit Robotic Manipulator, Ser. No. 07/156,256 filed Feb. 16, 1988 now U.S. Pat. No. 4,848,179, by the applicant; and to an earlier filed application entitled, Robotic Arm Systems, Ser. No. 07/156,388, filed Feb. 16, 1988 by the applicant and another; which applications are co-pending herewith.

2. Background

Optically coded digital laser communications between orbiting satellites provides an attractive alternative to other forms of communications due to its inherent immunity to hostile electromagnetic jamming. Such communication links require targeting or tracking and switching of coded laser beams from one satellite to several others at high speeds over wide angles with angular resolutions of less than a microsteradian. High speed spatial maneuverability of laser beams also has wide applications in spatial modulators used, for example, in cryptographic intelligence and in communication links. In each of the aforerecited target and modulation applications a device capable of sweeping or moving a laser produced light beam over a wide angle at a rapid rate with high resolution is highly desirable, if not altogether a necessity.

Acoustic Optics Bragg cells are capable of spatially modulating the deflected output beam of an inputted laser beam. Accordingly the Bragg cells find application in laser printers and in apparatus for encrypting optically coded signals. Such kind of spatial modulators, however, deflect the light beam in only one plane and, moreover, the deflection angle is dependent upon the laser wavelengths, the acoustic speed in the cell and on the acoustic frequencies. These limitations are known to those skilled in the art. Moreover, acousto optic cells are usually large in size. A more compact device capable of deflecting a laser beam, including a modulated laser beam, over a wider angle than that offered by systems incorporating Bragg cells and which allows modulation over a solid angle rather than over a planar angle is highly desirable in this application and, accordingly, is a feature of the present invention.

Switching requires changing the direction of the laser beams over wide solid angles, greater than one steradian, and positioning the beam to locations with a close tolerance of less than a microsteradian. A small low mass device offers rapid scanning ability over large solid angles and that is capable of orienting to any specified direction with high resolution is desirable and is another feature of the present invention.

The ever faithful mirror is one structure that permits light beam deflection. It is easier usually to move a light weight mirror than a typical laser and the equipment associated with a laser. A simple planar mirror, however, is not capable of moving a light beam as fast as those known dual mirror systems; containing a pair of mirrors that provide "angle multiplication". For a given angular movement of a mirror, the light beam is swept through a greater angle, hence, the angular movement is multiplied. With angle multiplication the light beam is repositioned more quickly. Others have recognized this angle multiplication phenomenon.

Systems employing pairs of mirror having their reflective surfaces confronting one another to provide positioning of a beam of light with angle multiplication features are known in the patent literature. In U.S. Pat. No. 3,902,783 granted Sept. 2, 1975 to Bodlaj, entitled Piezo Electric Beam Deflector, a pair of mirrors is adjustable in angular positions to position an inputted light beam at various angles of output. The mirror positioning is accomplished by piezoelectric motor devices, actuators. The Bodlaj device achieves angle multiplication of the light beams in but one plane. Similarly, U.S. Pat. No. 3,531,183, granted Sept. 29, 1970 to Aagard for an invention, entitled "light beam deflector", describes a light deflecting structure incorporating two non-parallel mirrors that make use of multiple deflections of the inputted light beams between the mirrors to provide cumulative magnitude of the deflection angle, that is, angle multiplication. However, as in the Bodlaj patent the Aagard device provides angle multiplication in but a single plane. U.S. Pat. No. 3,414,354 granted Dec. 3, 1968 to Siegler uses the characteristics of multiple deflections between non-parallel mirrors for concentrating the flex density in a Raman Spectrometer. A mirror structure that permits beam positioning in a single plane is limited in application.

Accordingly an object of the present invention is to provide an agile and accurate apparatus for orienting a coherent light beam over a wide range of azimuthal and vertical angles using deflection principles of non-parallel mirrors. A further object of the invention is to provide a light directing apparatus having application as a spatial modulator in light communication systems, capable of maneuvering a light beam over a range of 360 degrees of azimuth with minor exception.

SUMMARY

The novel light deflection apparatus includes a pair of mirrors mounted in confronting relationship. One of the mirrors is fixed in position and contains a central window, in which to input a laser light beam or in which to mount a suitable light beam generating source, such a diode laser. The other mirror is movably mounted so as to vary the degree of tilt between the mirrors, the azimuthal location of the bisecting plane of symmetry and the spacing. In a specific aspect to the invention at least one of the mirrors is supported by a piezoelectric type electromechanical actuator, which has the capacity for rapidly positioning the mirror. With the mirrors being non-parallel, light from the laser inputted from the direction of one mirror normal to the surface of the mirror exits from the apparatus at an azimuthal position along the peripheral edge of the mirror after undergoing multiple reflections between the mirror surfaces and at an angle to the mirror surface. The circumferential or azimuthal position at which the light beam exits the apparatus may be varied by orienting the bisecting plane of symmetry in different directions. The vertical angle at which the light exits the apparatus depends upon the extent by which the mirrors are tilted relative to one another; changes in that tilt angle are reflected in greater angular changes in the output beam direction, accomplishing angle multiplication.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE DRAWINGS

FIG. 1 illustrates an embodiment of the invention partially in schematic form and partially in block diagram form;

FIGS. 2a and 2b pictorially illustrate the mode of operation of the invention of FIG. 1;

FIG. 3 illustrates the principle of angle multiplication inuring in the operation of the invention;

FIG. 4 pictorially illustrates operation of the embodiment of FIG. 1 in a light communication system;

FIGS. 5a and 5b shows a component of a preferred actuator assembly for the embodiment;

FIG. 6 pictorially illustrates a piezo electric actuator formed of elements depicted in FIGS. 5a and 5b used in the preferred embodiment;

FIG. 7 illustrates a spatial light modulator that incorporates the invention; and FIG. 8 symbolically illustrates an alternative magnetic levitation type actuator used in an alternative embodiment.

DETAILED DESCRIPTION OF A PREFERRED EMBODIMENT

As illustrated in schematic form in FIG. 1, the apparatus includes a first or top mirror 1, which is fixed in position by a support 3, represented in dash lines, and a second or bottom mirror 5, which is moveably mounted. A positioning device 7 underlies and supports lower mirror 5 as represented by the coupling line 9. The positioning device permits the mirror to be oriented at any skewed angle with respect to the upper mirror within a certain solid angle. And in this preferred embodiment the lower mirror is an integral part of the top most "wafer" in a wafer stack from which the positioner 7 is constructed, described later in this specification. However it is recognized that the lower mirror may be supported by controlled positioning devices of alternative structure capable of providing the quick response desired in the combination, all of which are within the scope of the invention, including but not limited to magnetic levitation type mechanisms which are known in industry in which the lower mirror is formed so as to be the part of that structure in which the mirror is the levitated element.

Each of the mirrors is preferably circular in shape and is of a high reflectivity characteristic, with the reflective surfaces oriented facing one another. A controller 10 is provided to supply electrical control currents via lead 12 to an actuator or positioner 7, as represented in block diagram form, which together serve as the means to control the position of one mirror. Suitably the top mirror is coated with aluminum to form the highly reflective mirror surface and that aluminum is overcoated with four overlayers of dielectric material, a known lamination, that enhances the reflectivity of the surface based on the wavelength of the laser light.

A laser diode assembly 11 is imbedded in an opening or window in the center of top mirror 1. A power source 13, represented in block diagram form, provides the operating power for laser 11 as is schematically represented in the figure. The output end of the laser diode is oriented exactly flush with the mirrored surface of mirror 1, such that the laser beam exits exactly normal to the surface of the mirror.

In operation the source powering the laser is energized and the laser emits a light beam. Control circuit 10 may be set by the operator to energize the positioner 7, to position mirror 5 at a particular angle relative to top mirror 1, the azimuthal location, that is, the radial location, the location along a circle as may be defined about the periphery of circular mirror 1, of maximum spacing and the relative axial spacing between the two mirrors. In this configuration when the bottom mirror is oriented parallel to the top mirror, a rare case that is not illustrated, and when the light output from laser 11 is normal to the mirrored surface of the bottom mirror, the light beam is trapped between the mirrors, except for a diffractive part. However, even the slightest degree of non-parallelism between the two mirrors allows the laser beam to undergo multiple reflections along a plane determined by the plane joining the maximum normal opening to the minimal normal opening at the circumference of the mirrors, referred to as the bisecting plane of symmetry.

It may be shown that for any fixed position of the bottom mirror there is only one unique bisecting plane of symmetry, joining the maximum and minimum spacings between the two mirrors. The view illustrated in FIG. 1 is shown as a cross section along the unique plane joining the maximum, at the left side in the figure, and minimum, at the right side in the figure, above described. Hence, the laser beam escapes from between the mirrors and out along that unique bisector plane after undergoing multiple reflections as illustrated by the dotted line, lambda, in the figure.

By shifting the lower mirror in the slightest the output of the laser beam escapes at an entirely different azimuthal angle, A, as illustrated pictorially in FIGS. 2a and 2b. Hence, a small movement of the bottom mirror provides a means for spatial positioning of the beam of light. It is seen that the azimuthal angle does not depend on the tilt angle of the bottom mirror with respect to the top mirror. Instead it depends only on the non-parallelism and the azimuthal location of the bisecting plane of symmetry.

The capability of multiplying the bottom mirror tilt angle is illustrated in FIG. 3 in which only one-half of the plane of symmetry of the embodiment is illustrated to an enlarged scale. As shown after each internal reflection the light beam gains twice the tilt angle. Thus if the tilt angle is $\delta$ degrees, then the output beam tilt angle is 14 $\delta$ degrees following six internal reflections in the top mirror. Effectively this yields an angle multiplication factor of 14. The multiplication factor depends on the radius of the top mirror, the mirror to mirror spacing in the region between the two mirrors and the bottom mirror tilt angle relative to the top mirror, the latter of which determines the number of internal reflections of the light beam that occurs in operation. Small changes in the bottom mirror tilt angle thus cause larger angular changes in the laser beam's output angle.

The device's capability for azimuthal beam positioning and angle multiplication in operation permits use in digital laser communications systems as illustrated in FIG. 4. As symbolically partially illustrated the light beam positioner 25 incorporates a laser 26 that is digitally encoded by code transmitter represented in block 24. The light beam represented by the Greek letter lambda is formed in the region between the fixed mirror 27 and movable mirror 28 and exits from about periphery of the device. In the figure the shaded areas 21 on the imaginary sphere 23 depicts a targetable area. With the positioner orienting the mirror any spot on the imaginary surface may theoretically be targeted. However, in practice at least one or more support posts, not illustrated, will extend from the upper to lower mirrors at different locations along the mirrors periphery, effectively obstructing exit of the light beam at those discrete peripheral locations. However this partial obstruction is effectively eliminated by incorporating suitable optically transparent support posts.

The specific form for positioner 7 may be of any one of a variety of structures, including the robotic arm type positioners and controls disclosed in the prior applications for patent refered to earlier in this specification. One of those positioner structures is of the piezoelectric type, which is able to respond more quickly to provide mechanical movement upon application of an electrical voltage than other more massive types of positioners. Thus in a preferred embodiment positioner 7 is formed of a stack of disk shaped wafers 14 and 16, separated by and bonded to a triad of barium titanate piezo electromechanical transducers 15, 17 and 19, each of which serves as an actuator, an individual pair of which are presented in FIGS. 5a and 5b. Metalized leads, not illustrated, lead from either end of each transducer through a central opening 20 for connection to external sources of dc control voltages.

When each transducer is independently subjected to different voltages each strains to different extents, thereby orienting one of the wafers at a unique angle with respect to the adjacent wafer. When a large number of such wafer pairs are stuck together to form a stack and each transducer is separately excited, one may orient the top most wafer with respect to the bottom most wafer at an infinite variety of inclinations.

As presented pictorially in FIG. 6, the positioner 7' represents a stack of the wafers on a base 6. The end wafer 5' is a mirror surface and forms the bottom mirror 5 represented earlier in FIG. 1. In one preferred example the wafers are approximately two to three centimeters in diameter and one to two millimeters in thickness.

Suitably control voltages are applied to the electrical leads to adjust the physical dimension of each piezoelectric in the actuator. In so doing the angle of tilt of the mirror supported by the piezo electric stack is selectively changed. Hence, the angle at which the laser beam is emitted from the assembly is also changed. Further by suitable application of control voltages the plane of tilt is changed and the azimuthal angle at which the laser beam is emitted from the assembly is also controllably changed. Lastly, one mirror may be moved in toto relative to the other mirror.

The exploitation of non-parallelism between the two mirrors permits spatial modulation in the device schematically illustrated in FIG. 7 to which reference is made. A spatial modulator, represented in the dash lines 31, is formed of the light beam positioning element, 33, symbolically illustrated, containing the two mirrors, Laser and other components, previously described in detail; and a series of optical couplers in any number consistent with the availability of space, are distributed and fixed in position about the periphery of the light beam positioning element, only four of which, A, B, C, and D, are symbolically illustrated in FIG. 7 for ease of explanation, to selectively receive light that exits element 33 at the respective coupler location. A control circuit 35, suitably a preprogrammed controller that drives the actuator directly supporting and orienting the lower mirror of the device 26 in the manner earlier described, positions the light output selectively to any one of the light couplers in the order specified by the program. For example the control circuit may be programmed to cause the light beam exiting element 26 to be positioned within a given time interval in the sequence ABCADDCBA; and then repeat this sequence, thereby "scrambling" or encrypting the spatial modulator output. In such a system the receiving end must effectively synchrously operate in the same sequence to decode the information inherent in or carried by the light beam as is known to those skilled in the electronic signal encryption arts.

The output from the couplers may be converted to electrical signals, such as RF, by known conversion devices and the electrical signals may be transmitted by wires or wirelessly to the remote receiver, represented as block 37 with the latter unscrambling or decrypting the signal. Alternatively light transmission may be used in lieu of electrical signals. In that arrangement the remote receiver converts the light to the electronic forms as may be needed to use the transmitted information. Preferably the light transmission paths between the spatial modulator and the remote receiver is formed by a plurality of fiber optic lines, one for each optical coupler and which in the given example is four, formed into a fiber optic cable 39.

As in the systems earlier discussed the light inputted to and so transmitted by the spatial modulator may be unmodulated to provide a simple on or off signal or it may incorporate a modulator as represented in block 36 to thereby modulate the light to carry modulation information.

If deflections larger than that which the piezoelectric type actuator is capable of providing are needed, the bottom mirror can be positioned by a positioning device having greater deflection characteristics, such as magnetic levitation devices, known to those familiar with positioning devices. As symbolically represented in FIG. 8 in such a levitation device the mirror 5" is included on a base of magnetic material, such as iron, and is made to "float" through control of magnetic flux provided by electromagnetic coils 41 and 43. In as much as levitation devices of this type are known, it is not necessary to describe further the mechanisms and control circuits for same. Through control of the magnetic field generated in the coils the mirror may be tilted in accordance with the manner earlier described for the first embodiment.

Referring again to FIG. 1, diode laser 11 suitably comprises a three micron range output rated at approximately one milliwatt in the visible light regions. The laser is imbedded at the center of the upper disk, the latter of which is approximately two centimeters in diameter.

Suitably the mirror surface may be manufactured following installation of the laser. By simply masking the output surface of laser 11 aluminum deposition techniques may be used to mirror the surface of the wafer followed by application of four dielectric overlayers, a conventional laminate, known to those skilled in the art, for enhancing mirror reflectivity. The entire assembly is thus very small in size, height, and weight and quick to respond to control voltages.

Additional variations may be made to the structure. For example, in the described arrangement the lower most mirror, which is movable, is of a slightly larger diameter than the upper mirror and the light beam emanates in an upward direction. Alternatively the upper mirror may be made larger in diameter than the lower one in which case the light beam would emanate in a downward direction, opposite to that shown in the illustration. Further either or both mirrors may be made movable, although the structure is of greater simplicity if only one is movable.

Additionally, the preferred embodiment was shown to have a laser mounted to and embedded within the upper mirror. It is within the scope of the present invention to instead employ a laser that is mounted spaced from the upper mirror in fixed relation thereto. The central window in the upper mirror then serves to allow entrance of the laser's light output. The laser is positioned to emit light perpendicular to the surface of the upper mirror through the window and along the axis of the upper mirror. In all respects the coherent light beam in this alternative structure is effectively the same as that presented by the embedded laser of the preferred embodiment. Indeed if cost considerations become a factor a separately supported inexpensive laser is the most practical choice, since it may be purchased off-the-shelf.

The foregoing embodiments of the invention were described in connection with one type of electromagnetic energy, namely light, and, moreover, that light is the coherent type of light produced by a laser. As those skilled in the art appreciate other embodiments of the invention are possible that do not incorporate the laser as the source of electromagnetic energy. Reference may be made again to FIG. 1 and the preceeding figures in which element 11, the laser, may instead be regarded as a microwave energy generator or transmitter that produces electromagnetic energy in the microwave frequency region and that microwave energy may be modulated or not as desired. The microwave energy may be formed within a beam and microwave energy is reflected by metal surfaces. In such an embodiment, the specific dimensions of the reflecting surfaces will differ from the dimensions of the mirrors in the embodiment that uses a laser, a detail that those skilled in the art may determine with reasonable experimentation. A further embodiment is recognized as one in which element 11 is a source of collimated light, a known light source, instead of a laser. The foregoing and other specific forms of electromagnetic energy producing devices may be substituted in the disclosed combination with reasonable experimentation.

It is believed that the foregoing description of the preferred embodiment of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. Apparatus for radially and elevationally positioning an electromagnetic energy beam produced by an electromagnetic energy source, which comprises in combination:

a pair of electromagnetic energy reflectors, each of said electromagnetic energy reflectors having an electromagnetic energy reflecting surface; said reflectors being located with one of said reflectors overlying the other to define a region therebetween with the respective electromagnetic energy reflecting surfaces facing one another to reflect electromagnetic energy therebetween; one of said electromagnetic energy reflecting surfaces being of a larger area than the other one of said surfaces and one of said surfaces being inclinable at an angle in three dimensions to the other to define a bisecting plane of symmetry with respect thereto, whereby said bisecting plane of symmetry may be selectively oriented in radial direction;

control means coupled to one of said electromagnetic energy reflecting surfaces for selectively varying said angle of incline of said coupled surface relative to the other electromagnetic energy reflecting surface and for radially positioning said bisecting plane of symmetry; and means for inputting an electromagnetic energy beam produced by said electromagnetic energy source into said region with said beam entering said region in a direction orthogonal to one of said electromagnetic energy reflecting surfaces and coaxial with said one surface; whereby said electromagnetic energy beam undergoes multiple reflections at the reflecting surfaces as the beam propagates in the region between said surfaces and exits from between said surfaces at an angle relative to the surface of the one of said electromagnetic energy reflecting surfaces having the greater size and at a radial direction determined by said control means.

2. The invention as defined in claim 1 wherein said electromagnetic energy source comprises: light source means for producing a beam of light.

3. The invention as defined in claim 2 wherein said light source means comprises further: laser means for producing a beam of coherent light.

4. The invention as defined in claim 2 wherein said light source means comprises further: collimated light source means for producing a beam of collimated light.

5. The invention as defined in claim 1 wherein said electromagnetic energy source comprises: microwave energy generating means.

6. The invention as defined in claim 1 wherein said electromagnetic energy reflecting surfaces are flat surfaces and wherein each of said electromagnetic energy reflecting surfaces are of substantially identical in shape.

7. The invention as defined in claim 6 wherein said shape of said electromagnetic energy reflecting surfaces comprises a circle.

8. The invention as defined in claim 7 wherein said electromagnetic energy source comprises: light source means for producing a beam of light.

9. The invention as defined in claim 8 wherein said light source means comprises further: laser means for producing a beam of coherent light.

10. Apparatus for radially and elevationally positioning a light beam produced by a laser, which comprises in combination:

a pair of closely coupled mirrors, said mirrors being supported in confronting relationship to define a region therebetween and with one of said mirrors being tiltable in three dimensions at an angle relative to the other to define a bisecting plane of symmetry with respect thereto, whereby said bisecting plane of symmetry may be selectively oriented in radial direction;

control means coupled to one of said mirrors for positioning said coupled one of said mirrors at selected angles of tilt relative to the other mirror and for radially positioning said bisecting plane of symmetry; and means for inputting a light beam produced by said laser into said region with said beam entering said region in a direction orthogonal to the surface of and coaxial to one of said mirrors; whereby said light beam undergoes multiple reflections at the reflecting surfaces as the beam propagates in the region between said closely coupled mirrors and exits from said region at an angle relative to the surface of one of said mirrors and in a radial direction determined by said control means.

11. The invention as defined in claim 10 wherein said control means continuously varies the position of said bisecting plane of symmetry on a periodic basis, whereby the light beam is outputted from the apparatus in a scanning motion.

12. The invention as defined in claim 10 further comprising: a plurality of light energy transmission means; said plurality of transmission means being spaced about the periphery of said first mirror for receiving a light beam outputted from the mirrors at the respective location whereby each of said light energy transmission means is selectively periodically coupled to said light beam.

13. The invention as defined in claim 10 wherein said control means is coupled to said first one of said mirrors and wherein said second one of said mirrors is supported in a stationary position.

14. The invention as defined in claim 10 wherein said control means further comprises: mirror positioning means for selectively changing the attitude, azimuthal direction of attitude, and spacing of one mirror relative to the other mirror to change the angle of exit of said light beam and the azimuthal position along the periphery of the mirrors at which said light beam exits.

15. The invention as defined in claim 10 wherein each of said first and second mirrors comprise a circular geometry.

16. The invention as defined in claim 15 wherein said first mirror is of a diameter greater than said second mirror.

17. The invention as defined in claim 10 wherein said first mirror is of a larger surface area than said second mirror.

18. The invention as defined in claim 10 further including: a plurality of optical coupling cells, said cells being located at different positions about the periphery of said mirrors for receiving light beams emitted at corresponding peripheral positions.

19. The invention as defined in claim 10 further comprising: second control means coupled to said other one of said two mirrors for selectively changing the orientation of said other mirror relative to said one mirror.

20. The invention as defined in claim 10 wherein one of said mirrors include a window for supporting said laser within said window, said window being located centrally within said one mirror.

21. The invention as defined in claim 10 wherein one of said mirrors includes a window for admitting a beam of light produced by said laser, said window being located centrally within said one mirror.

22. The invention as defined in claim 10 wherein said control means further comprises magnetic levitation means for levitating one of said mirrors.

23. The invention as defined in claim 10 wherein said control means further comprises: a plurality of disks arranged in serial order adjacent one another to form a support pedestal for said coupled mirror and with each pair of adjacent disks defining a region therebetween; each of said regions including a plurality of three actuators evenly spaced about the periphery of adjacent disks and being coupled thereto, said actuators each comprising a piezoelectric means of a predetermined length and responsive to a selected level of voltage applied thereto for providing a selected change in the length thereof, whereby corresponding locations on adjacent disks may be varied; and control voltage means for selectively applying voltages to said actuator means, whereby the attitude and orientation of said pedestal may be changed.

24. Apparatus for selectively positioning a beam of light to various locations about a three dimensional space, comprising:

a mirror assembly, said mirror assembly including first and second mirrors each having a reflective surface;

said first and second mirrors being oriented spaced apart with said reflective mirror surfaces facing one another and being centered along a common axis;

said first mirror having a generally planar surface and being circular in geometry and including a light window located at the center thereof; said mirror comprising a lamina of a light transmissive layer and a light reflective layer with the light transmissive layer being located on the top of the mirror; said second mirror having a generally planar surface and being circular in geometry; said mirror comprising a lamina, including a light reflective layer, with said light reflective layer being located on the top of said mirror; said second mirror having its center located on the axis of said first mirror for receiving light admitted through said light window of said first mirror;

light source means for producing a light beam;

support means for directing said light beam through said light window in a direction orthogonal to said first mirror and into the space between said mirrors for incidence upon said second mirror, whereby said light beam is emitted from said mirror assembly at a peripheral portion of one of said mirrors and at an angle with respect to the surface of said one of said mirrors;

control means for changing the orientation of said second mirror axis relative to said first mirror axis and for changing the rotational position of said first mirror relative to said second mirror and for changing the spacing between said mirror centers, whereby the peripheral position from which said light beam is emitted and the angle of emission is changed.

25. The invention as defined in claim 24 wherein said first mirror includes a centrally located window for admitting light from said light source means; said light source means being positioned by said support means behind said first mirror.

26. The invention as defined in claim 25 wherein said support means comprises a centrally located window in said first mirror.

27. The invention as defined in claim 24 wherein said control means further comprises magnetic levitation means for levitating one of said mirrors.

28. The invention as defined in claim 24 wherein said control means further comprises: a plurality of disks arranged in serial order adjacent one another to form a support pedestal for said first mirror and with each pair of adjacent disks defining a region therebetween; each of said regions including a plurality of three actuators evenly spaced about the periphery of adjacent disks and being coupled thereto, said actuators each comprising a piezoelectric means of a predetermined length and responsive to a selected level of voltage applied thereto for providing a selected change in the length thereof, whereby corresponding locations on adjacent disks may be varied; and control voltage means for selectively applying voltages to said actuator means, whereby the attitude and orientation of said pedestal may be changed.

29. The invention as defined in claim 28 further comprising in combination: a plurality of optical coupling means, said optical coupling means being located spaced from one another about the periphery of said mirror for receiving light beam outputted from the periphery of said mirror at the corresponding spatial position occupied by said respective optical coupling means.

30. The invention as defined in claim 24 wherein said first mirror includes a light window located on the axis of said first mirror for passing an axially directed light beam therethrough.

31. The invention as defined in claim 24 wherein said light source means comprises: laser means for producing a beam of coherent light.

32. The invention as defined in claim 24 wherein said light source means comprises a coded light source containing coding information.

33. The invention as defined in claim 24 wherein said light source means comprises: collimated light source means for producing a beam of collimated light.

34. An optical coupler for selectively coupling a light beam to a plurality of outputs comprising:
   first means for positioning a light beam produced by a laser, which comprises in combination:
   a pair of closely coupled mirrors, said mirrors being supported in confronting relationship and defining a bisecting plane of symmetry with respect thereto and further defining a region therebetween;
   control means coupled to one of said mirrors for positioning said coupled one of said mirrors at selected angles skew to the axis of said other mirror and for radially positioning the bisecting plane of symmetry defined by said two mirrors;
   means for inputting a light beam produced by said laser from the direction of one of said mirrors orthogonal to and central of the surface thereof; whereby said light beam undergoes multiple reflections in the region between said closely coupled mirrors and exits from said mirrors at an angle relative to the surface of said mirrors and at a peripheral radial location thereon determined by said control means; and
   second means comprising a plurality of optical coupling means, each of said optical coupling means including an input for receiving light and an output; said plurality of optical coupling means being located spaced from one another about said first means, each of said optical coupling means for receiving said light beam outputted from the periphery of said mirror at the corresponding spatial position occupied by said respective optical coupling means and providing a corresponding output.

35. The invention as defined in claim 34 wherein said control means includes: a plurality of disks arranged in serial order adjacent one another to form a support pedestal for said coupled mirror and with each pair of adjacent disks defining a region therebetween; each of said regions including a plurality of three actuators evenly spaced about the periphery of adjacent disks and being coupled thereto, said actuators each comprising a piezoelectric means of a predetermined length and responsive to a selected level of voltage applied thereto for providing a selected change in the length thereof, whereby corresponding locations on adjacent disks may be varied; and control voltage means for selectively applying voltages to said actuator means, whereby the attitude and orientation of said pedestal may be changed.

36. The invention as defined in claim 34 wherein said control means includes: magnetic levitation means for levitating said coupled one of said mirrors.

* * * * *